Figure 1:
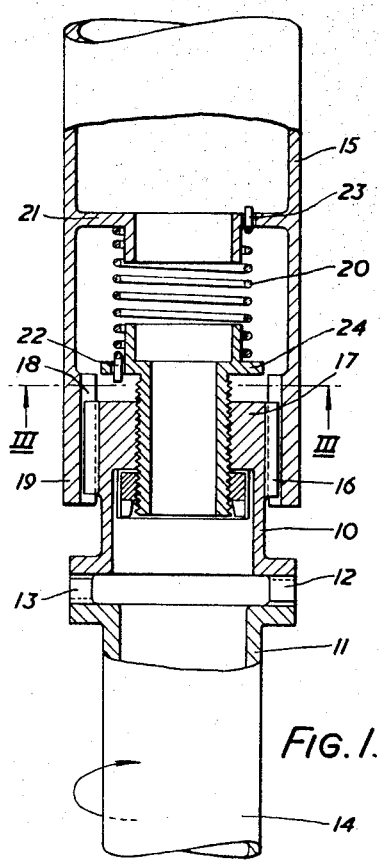

Dec. 1, 1959     B. M. R. IRONS     2,914,929
ASSEMBLIES INCLUDING HELICAL SPLINES AND COIL SPRINGS
Filed May 12, 1958

INVENTOR
B. M. R. IRONS
BY
*Watson, Cole, Grindle & Watson*
ATTORNEYS

United States Patent Office 2,914,929
Patented Dec. 1, 1959

2,914,929

ASSEMBLIES INCLUDING HELICAL SPLINES AND COIL SPRINGS

Bruce M. R. Irons, Whitton, England, assignor to D. Napier & Son Limited, London, England, a British company Application May 12, 1958, Serial No. 734,468

Claims priority, application Great Britain May 20, 1957

6 Claims. (Cl. 64—9)

This invention relates to assemblies of the kind including two relatively movable parts connected to one another by helical splines or the equivalent to permit relative longitudinal movement combined with rotary movement about the longitudinal axis, and a compression spring acting between the two parts.

Such assemblies are employed for example in freewheel clutches of the kind including a pair of clutch members connected respectively to input and output shafts, the clutch members having engaging teeth in the form of inclined ramps, and at least one of the members being urged by spring means towards the other member and connected to its associated shaft by a splined coupling or the equivalent. A disadvantage of such clutches is that the spring force may tend to force the edges or flanks of the splines against one another and thus produce a high frictional resistance to the movement of the movable clutch member. As a result it is necessary to employ a stronger spring, and this results in an increased frictional drag when the clutch is freewheeling.

It is an object of the invention to reduce the frictional drag when freewheeling by reducing the frictional load on the splined connection, as a result of which a lower spring force can be employed.

In an assembly of the kind referred to according to the present invention the mean radius of the helical spline connection and the mean radius of the coil spring are such that $$R \simeq r\sqrt{1+\sigma}$$

where R is the mean radius of the helical spline connection, r is the mean radius of the coils of the spring and $\sigma$ is Poisson's ratio for the spring.

The invention also resides in a clutch having two clutch members connected to input and output shafts, one of the clutch members being connected to its respective shafts by an assembly as defined.

Thus the ratio of the compression rate (i.e. load to produce unit deflection) to the torsional rate (torque to produce unit angular deflection) of a helical spring is $$\frac{1}{(1+\sigma)r2}$$

where $\sigma$=Poisson's ratio and $r$=mean radius of coils.

If it is assumed that there is a constant ratio between the compression force and the torque over the whole of the working stroke, the ratio of total axial deflection to total angular deflection is also constant and equal to $p/2\pi$ where $p$ is the pitch of the helix.

The required condition is then easily shown to be:

$$R = r\sqrt{1+\sigma}$$

where $R$=radius of helical groove.

This applied with some accuracy for relatively small displacements of a helical spring having a small helix angle.

Under the specified conditions the direction of the resultant force on the movable member will be substantially along the splines and the frictional resistance at the splines will be much reduced. It is of interest to note that this condition is independent of the pitch of the helix.

It is important that the spring should be in its free position when the splines are correctly aligned with one another since it is towards this free position that the resultant force will act. This free position may occur with the splines actually engaged, or if the splines are short length it may be necessary to align them on projections of their helical paths, during assembly, and after ensuring that the spring is in its free position, to move the splines along these projected paths into correct engagement. Thus according to a preferred feature of the invention an adjustment is provided between the two splines members or between one end of the spring and the associated member to enable the spring and/or one of the members to be rotated, and/or adjusted axially a small distance if necessary, until the free spring position coincides with the splines being in engagement.

Alternatively, if the adjustment can be performed so that the free position of the spring lies on the path of the movement dictated by the splines, possibly projected, then the requirements of the invention are satisfied. This can be achieved by relating, perhaps graphically, the axial movement to the rotational movement required from the free position to the initial engagement of the splines.

The required condition may also be affected to some extent by the moment of inertia of the movable member. If the radius of gyration is excessive the rotary component of acceleration will tend to be decreased and the direction of the resultant total acceleration may tend to be altered from the required direction along the length of the splines.

Thus preferably the radius of gyration of the moving parts which rotate with the movable member is approximately equal to the radius of the helical spline connection.

The invention may be performed in various ways but one specific embodiment will now be described by way of example with reference to the accompanying drawings in which—

Figure 2:
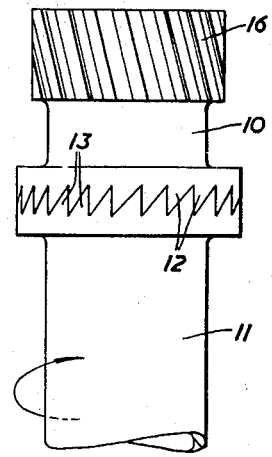
Figure 3:
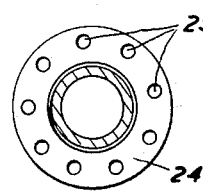

Figure 1 is a sectional side elevation of a free wheel or uni-directional transmission device, Figure 2 is a side elevation of the two clutch members with other parts removed for clarity, and Figure 3 is a sectional view on the line III—III in Figure 1 of the part 24.

In this example the invention is applied to a freewheel clutch for use in the drive to a helicopter rotor. The clutch comprises a pair of coaxial clutch members 10, 11 mounted for rotation on a vertical axis and each formed with inclined teeth 12, 13 spaced around the edges of their adjacent faces. The lower clutch member 11 which is connected to the driving shaft 14 is restrained against vertical movements, but the other movable clutch member 10 is connected to a hollow output shaft 15 by a helical spline coupling and is free to move axially. The spline coupling comprises a series of external splines 16 formed on a sleeve 17 attached to the clutch member 10, and a corresponding series of internal splines 18 on a hollow sleeve 19 secured to the output shaft.

A compression spring 20 having a small natural helix angle is located between the movable clutch member 10 and an abutment 21 fixed within this hollow output shaft 15. The ends 22, 23 of the coil spring are located in recesses respectively in a hollow part 24 secured to the movable clutch member 10 and in the abutment 21 on the output shaft, and in order to provide the necessary adjustment to allow this spring to be relaxed in its free state when the splines are engaged a series of angularly spaced recesses 25 are provided in the part 24, the adjacent end of the spring being inserted in the most convenient recess.

It will be seen that since the spline formations 16 are formed on a thin walled hollow sleeve and since all the parts secured thereto are likewise hollow, the radius of gyration of these movable parts 10 and 24 is approximately equal to the mean radius of the spline coupling.

In the operation of the device, as the input shaft 14 is rotated in the direction indicated by arrows in Figures 1 and 2, the teeth 13 of the driving clutch member or element will operatively engage and transmit rotation through teeth 12 to the driven clutch element 10. From clutch element 10 the interengaging helically inclined splines 16 and 18 transmit rotary movement to the output shaft 15. In the event the speed of the output shaft exceeds that of the input shaft, the ensuing engagement and cooperation between the inclined sides of the teeth 12 and 13 produces relative axial movement between the clutch members in a direction to disengage the said teeth, thus to permit relative rotation between these members. In such case it will be apparent that the output shaft 15 will continue to rotate in the same direction as indicated by the arrow in Figure 1. By virtue of the specific relationship between the dimensions of the spline coupling and the coil spring 20, as above specified, the friction between the splines during such axial movement is maintained at a minimum. This permits the use of a spring having a relatively weak axial thrust and substantially decreases the frictional drag when the parts are in overrunning relation.

What I claim as my invention and desire to secure by Letters Patent is:

1. A ratchet toothed uni-directional clutch, including two ratched toothed clutch elements connected respectively to input and output shafts, one of the elements being connected to its respective shaft by a helical spline coupling to permit relative longitudinal movement combined with rotary movement about the longitudinal axis, and including a coil spring the opposite ends of which are connected respectively to the two parts, namely, the clutch element and the associated shaft, the radius of the spline coupling and the mean radius of the coil spring being such that $R \simeq r\sqrt{1+\sigma}$ where R is the mean radius of the helical spline coupling, $r$ is the mean radius of the coils of the spring, and $\sigma$ is Poisson's ratio for the spring.

2. A clutch as claimed in claim 1 in which the radius of gyration of the moving clutch element is approximately equal to the mean radius of the helical spline coupling.

3. A clutch as claimed in claim 1 including adjustment means between one end of the spring and the part connected thereto, to enable this end of the spring to be rotated relatively to this part until the free relaxed spring condition coincides with the splines being in engagement.

4. A uni-directional clutch including two clutch members connected respectively to input and output shafts, one of the clutch members being connected to its respective shaft by an assembly comprising two relatively movable parts connected to one another by helical splines to permit relative longitudinal movement combined with rotary movement about the longitudinal axis, and including a coil spring the opposite ends of which are connected respectively to the two parts, the radius of the spline coupling and the mean radius of the coil spring being such that $R \simeq r\sqrt{1+\sigma}$ where R is the mean radius of the helical spline coupling, $r$ is the mean radius of the coils of the spring, and $\sigma$ is Poisson's ratio for the spring.

5. A uni-directional clutch as claimed in claim 4 in which the radius of gyration of the moving part is approximately equal to the mean radius of the helical spline coupling.

6. A uni-directional clutch as claimed in claim 4 including adjustment means between one end of the spring and the part connected thereto, to enable this end of the spring to be rotated relatively to this part until the free relaxed spring condition coincides with the splines being in engagement.

References Cited in the file of this patent

UNITED STATES PATENTS

| | | |
|---|---|---|
| 2,174,342 | Greulich | Sept. 26, 1939 |
| 2,371,330 | Irstad | Mar. 13, 1945 |
| 2,400,110 | Fitzgerald | May 14, 1946 |
| 2,428,128 | Sheppard | Sept. 30, 1947 |
| 2,691,875 | Schmitter | Oct. 19, 1954 |
| 2,787,144 | Chauvel | Apr. 12, 1957 |